May 5, 1942.　　　　　E. A. GREEN　　　　　2,281,876
FREQUENCY CONTROLLING SYSTEM
Original Filed Dec. 28, 1939　　　3 Sheets-Sheet 1
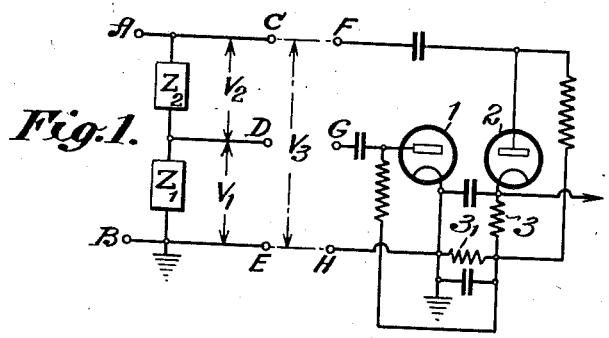
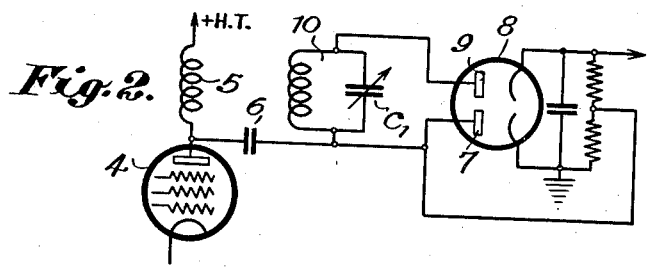
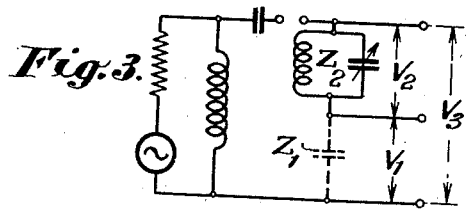
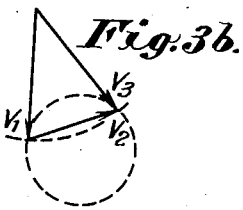
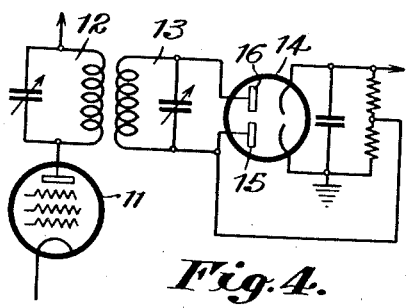
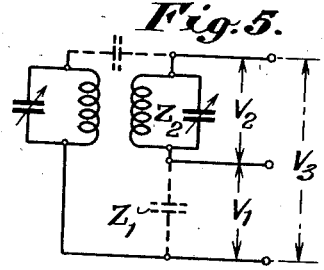
INVENTOR
Eric A. Green
BY H. S. Srover
ATTORNEY May 5, 1942.　　　　　　E. A. GREEN　　　　　　2,281,876
FREQUENCY CONTROLLING SYSTEM
Original Filed Dec. 28, 1939　　　3 Sheets-Sheet 2
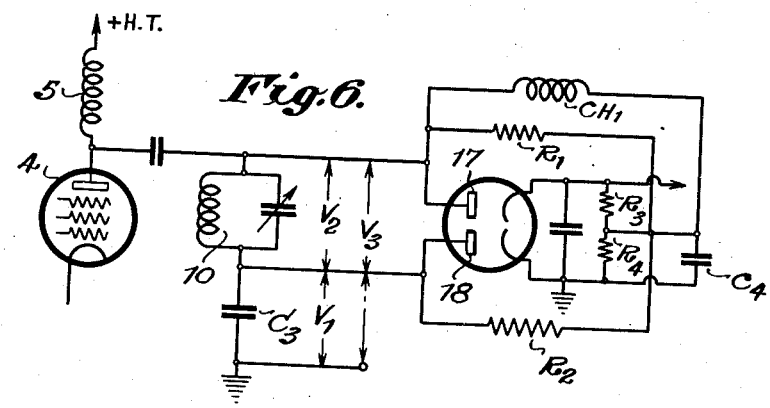
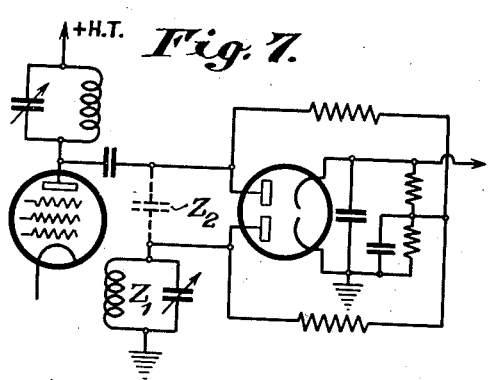
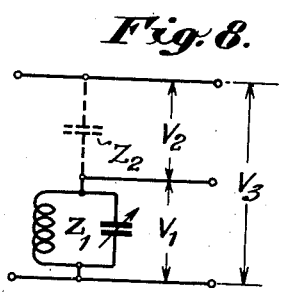
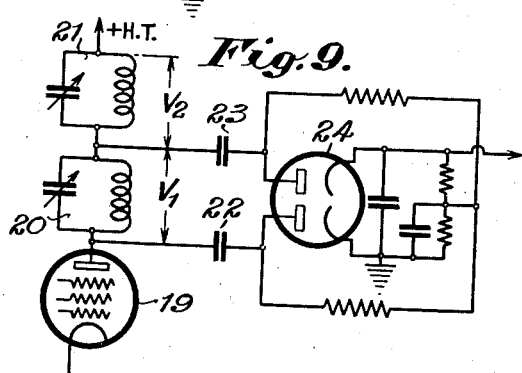
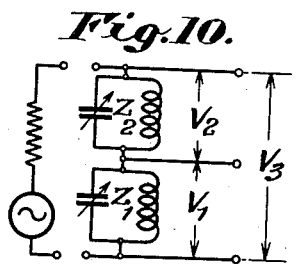
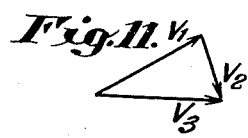
INVENTOR
Eric A. Green
BY H. S. Grover
ATTORNEY May 5, 1942.　　　　　E. A. GREEN　　　　　2,281,876
FREQUENCY CONTROLLING SYSTEM
Original Filed Dec. 28, 1939　　　3 Sheets-Sheet 3
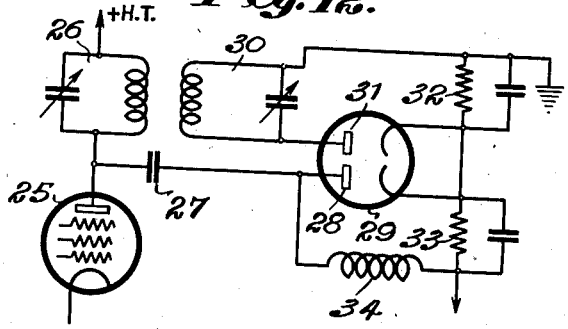
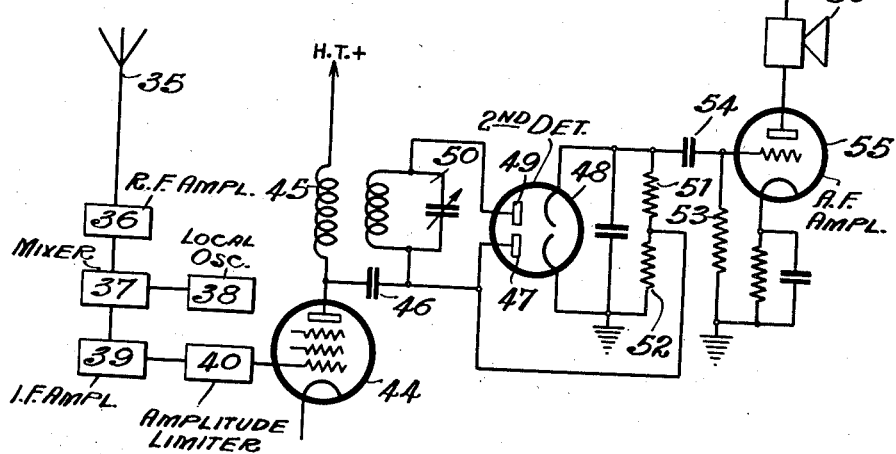
INVENTOR
Eric A. Green
BY
H. S. Srover
ATTORNEY Patented May 5, 1942

UNITED STATES PATENT OFFICE 2,281,876

FREQUENCY CONTROLLING SYSTEM

Eric Alfred Green, Southall, England, assignor to Electric & Musical Industries Limited, Hayes, Middlesex, England, a company of Great Britain Original application December 28, 1939, Serial No. 311,312. Divided and this application May 7, 1941, Serial No. 392,361

9 Claims. (Cl. 250—27)

This invention relates to frequency responsive circuits for use in automatic frequency control systems for radio receivers of the superheterodyne type, or for frequency modulation detecting circuits. This application is a division of my application Serial No. 311,312, filed December 28, 1939 patented July 8, 1941 as U. S. Patent No. 2,248,229.

In connection with automatic frequency control circuits for superheterodyne wireless receivers, it has been proposed to provide a discriminator circuit for deriving a direct current voltage from the intermediate frequency energy when the latter shifts from the assigned intermediate frequency value. The direct current voltage so derived is utilized in various ways for controlling the frequency of the local oscillations generated, and thus the beat frequency produced.

The object of the present invention is to provide various simple alternative forms of circuit arrangements which may be used for automatic frequency control, or in frequency modulation detecting circuits.

According to the present invention a high frequency signal rectifying circuit comprises in combination two impedance networks connected in series, a source of input signals, means for feeding said signals to said networks, means for rectifying separately the voltages set up in said networks, and means for combining said rectified voltages and utilizing the difference between these rectified voltages, or the difference between two voltages which are portions, or multiples, of these voltages.

The invention may be applied to a signal detecting circuit for frequency modulated carrier waves in which case means for utilizing the rectified voltages are constituted by low frequency reproducing apparatus.

According to a further feature of the present invention an automatic frequency control system includes a frequency discriminator arrangement containing at least two impedance networks connected effectively in series and means are provided for applying input signals whose frequency is to be controlled across one or more of said impedance networks, means also being provided for rectifying separately two voltages derived from these networks, further means being provided for combining said rectified voltages and utilizing the difference between these rectified voltages, or the difference between two voltages which are portions, or multiples, of these voltages respectively for effecting frequency control. In a particular system embodying the invention in which the input is applied across only one of the impedance networks, some form of coupling is required such that voltages will be set up across the other impedance network or networks. The impedances may be constituted by tuned circuits, or by capacity which may be the capacity to ground of a diode anode, supplemented by an extra capacity if necessary, when such is used to constitute said rectifying means.

In order that the invention may be more clearly understood and readily carried into effect, certain discriminator arrangements embodying the invention will now be described in greater detail, by way of example, with reference to the accompanying drawings in which:

Fig. 1 shows schematically the invention,

Fig. 1a is a vector diagram explaining the discriminator of Fig. 1,

Fig. 2 shows another embodiment of the invention,

Fig. 3 is the equivalent circuit diagram of Fig. 2,

Figs. 3a and 3b show vector diagrams of the circuit of Fig. 2,

Fig. 4 shows another modification,

Fig. 5 is the equivalent circuit diagram of Fig. 4,

Fig. 6 shows still another modification,

Fig. 7 illustrates still another modification,

Fig. 8 is the equivalent circuit diagram of Fig. 7,

Fig. 8a is a vector diagram for Fig. 8,

Fig. 9 shows another modification,

Fig. 10 is the equivalent circuit diagram of Fig. 9,

Fig. 11 is a vector diagram of Fig. 10,

Fig. 12 illustrates another embodiment,

Fig. 12a is the vector diagram of Fig. 12,

Fig. 13 shows schematically a frequency modulation (FM) receiver employing a detector of the type shown in Fig. 2.

Referring to Fig. 1 of the drawings, A and B are signal input terminals across which is connected a potentiometer consisting of impedances $Z_1$ and $Z_2$. C, D and E are output terminals from which can be taken the two voltages to be rectified, thus $V_1$ and $V_2$, $V_1$ and $V_3$ or $V_2$ and $V_3$. In the case shown $V_1$ and $V_3$ are rectified. The voltage $V_1$ is fed to terminals G and H connected to a diode rectifier 1, and the voltage $V_3$ is fed to terminals F and H connected to diode rectifier 2. The rectified voltages derived from the diodes are subtracted in load resistances 3 and 3' connected to the cathodes of the diodes 1 and 2. The vector diagram (shown in Fig. 1a) at the correct intermediate frequency forms an isosceles triangle in which $V_1$ is equal to $V_3$.

Referring to Fig. 2, an intermediate frequency amplifying valve 4 is shown provided with a choke coil 5 in its anode lead and coupled through a condenser 6 to one anode 7 of a double diode valve 8. The anode 7 is connected to the other anode 9 of the double diode valve 8 through a circuit 10 tuned to a frequency slightly to one side of the correct intermediate frequency. In this arrangement the potentiometer corresponding to the impedances $Z_1$ and $Z_2$ in Fig. 1 is constituted by the capacity from diode anode 9 to ground ($Z_1$) and the tuned circuit 10 ($Z_2$). The equivalent circuit diagram is shown in Fig. 3. Explanatory vector diagrams are shown in Figs. 3a and 3b. The arrangement operates so that the voltages applied to the anodes 7 and 9 are equal in magnitude at the correct intermediate frequency. Thus, the voltage $V_1$ across $Z_1$ will lag 90° behind the current, and the voltage $V_2$ across $Z_2$ will lead or lag the current depending upon the adjustment of its resonant frequency. The locus of $V_2$, when plotted to polar coordinates, can be represented by a point on a circle passing through the origin as shown in Fig. 3a. By adding the voltages $V_1$ and $V_2$, $V_3$ is obtained. Adjustment of the resonant frequency of $Z_2$ enables $V_1$ to be made equal to $V_3$, this occurring when the arc shown dotted in Fig. 3b intercepts the circle. It will be seen as $V_2$ is not at right angles to $V_1$, that the tuned circuit $Z_2$ must be made resonant at a frequency other than the exact intermediate frequency, but the amount off resonance of the circuit frequency is not sufficient seriously to affect the overall selectivity of the receiver.

Referring to Fig. 4, an intermediate frequency amplifying valve 11 is shown coupled by two tuned circuits 12 and 13 to a double diode rectifying valve 14. No bypass condenser is provided between the circuits 12 and 13. There is mutual inductance between the coils in the tuned circuits 12 and 13, but this is not essential as the stray capacity coupling is usually sufficient. The circuits 12 and 13 have to be slightly mistuned from the actual intermediate frequency. The diagram equivalent to Fig. 4 is shown in Fig. 5, and it will be seen in this case that the impedance $Z_1$ is constituted by the capacity to ground of the diode anode 16, the impedance $Z_2$ being constituted by the tuned circuit 13.

The arrangement described with reference to Fig. 2 may be modified by providing an actual condenser for the impedance $Z_1$ as shown in Fig. 6 at $C_3$. This will entail a greater degree of mistuning of the circuit 13. Excessive mistuning may be compensated for by balancing a portion of the rectified voltage obtained from $V_1$ at the correct intermediate frequency against a smaller portion of the rectified voltage obtained from $V_2$ at the correct intermediate frequency. One method of effecting this is by employing two extra resistances $R_1$ and $R_2$. The required effect is then obtained provided $R_3$ is less than $R_4$. In the case where the existing capacity is too high, its effective value at the correct intermediate frequency can be reduced by connecting a filtering system, consisting of an extra choke coil $CH_1$ and condenser $C_4$, to the anode 17 instead of to the anode 12 which is the more usual point.

The connections of $Z_1$ and $Z_2$ may be reversed as shown in Fig. 7 in which $Z_2$ is provided by the stray capacity between the anodes of a double diode valve. The equivalent diagram is shown in Fig. 8, and the vector diagram in Fig. 8a.

Referring now to Fig. 9 an intermediate frequency amplifying valve 19 has connected in its anode lead two tuned circuits 20 and 21 which constitute respectively the impedances $Z_1$ and $Z_2$. These tuned circuits are shown coupled through condensers 22 and 23 to the anodes of a double diode valve 24. In this case the series connected circuits 20 and 21 are tuned to frequencies on either side of the correct intermediate frequency. The equivalent diagram is shown in Fig. 10 and the vector diagram in Fig. 11, this arrangement being operated with or without coupling between the tuned circuits 20 and 21.

Referring now to Fig. 12, an intermediate frequency amplifying valve 25 has a primary tuned circuit 26 in its anode lead, and is coupled through a condenser 27 to one anode 28 of a double diode 29. A secondary tuned circuit 30 is connected directly to the other anode 31 of the double diode valve. This arrangement is an example of the particular case in which the input is applied to one impedance only, namely the tuned circuit 26, and some form of coupling has to be provided so that a voltage can be set up across the other impedance, namely the tuned circuit 30. The arrangement operates in a manner different from that described with reference to the preceding circuits. It will be seen that the voltages $V_1$ and $V_2$ are those set up across the primary and secondary tuned circuits respectively. These voltages are rectified separately in the load resistances 32 and 33, the A. F. C. (automatic frequency control) lead being connected at the junction between the resistance 33 and a choke coil 34 which serves to complete the direct current path between the anode 28 and its cathode. Fig. 12a shows vectorially the relation between the voltage $V_p$ across the primary circuit 26, and the voltage $V_s$ across the secondary circuit 30.

The secondary circuit 30 is tuned to a frequency slightly different from that of the correct intermediate frequency. If the mistuning is represented by $\Sigma$ kilocycles per second, the A. F. C. voltage will be zero at $2\Sigma$ kilocycles per second off the correct intermediate frequency as well as at the correct intermediate frequency. The exact degree of mistuning to be selected depends on the desired overall selectivity. Mistuning of about 4 kilocycles per second will be necessary, but this is not a serious disadvantage when compared with usual forms of discriminator circuits which are themselves unselective.

While reference has been made to the use of the aforesaid circuit arrangements described for automatic frequency control purposes, it is to be understood that they are all operative as detectors of frequency modulated carrier waves.

The application to such a purpose of the arrangement shown in Fig. 2 is illustrated in Fig. 13. In this figure an antenna 35 is shown connected to a receiver including a radio frequency amplifier 36, a mixer 37, local oscillator 38, intermediate frequency amplifier 39, amplitude limiter 40 and an intermediate frequency amplifying valve 44 corresponding to the valve 4 in Fig. 2. The choke coil 45, condenser 46 and the connections of the anodes 47 and 49 of the double diode 48 to the tuned circuit 50 are as shown in Fig. 2. Rectified voltages are set up across the resistances 51 and 52, and these voltages are suitable for reproduction. For this purpose the diode 48 is connected through a resistance capacity coupling 53, 54 to the control grid of an amplifying valve 55 connected to a loudspeaker 56.

It will be understood that the forms of circuit for effecting automatic frequency control as described may be utilized in circuits for detecting frequency modulated waves in a similar manner to that described with reference to Figs. 2 and 13. Further, it will be understood that the invention may find application to forms of circuit arrangements for effecting automatic frequency control or detection of frequency modulated waves, other than those circuits specifically described.

I claim:

1. In combination with a tube having frequency modulated carrier wave energy applied thereto, an inductive element in the plate circuit thereof, a pair of diodes, a resonant circuit connected between the anode of one diode and ground, a capacitative reactance connected between the anodes of said diodes, a resistive element connected between the cathodes of said diodes, a carrier bypass condenser shunted across said resistive element, one end of the resistive element being grounded, a non-reactive connection between substantially the mid-point of said resistive element and the second of said anodes.

2. In combination with a signal transmission tube upon whose input electrodes are impressed modulated carrier waves, a tuned inductive element connected in the tube output circuit, a pair of diode rectifiers, a resonant circuit coupling the anode and cathode of one diode, a condenser coupling said tuned element to the anode of the second diode, a resistor connected between the cathodes of said diodes, means connecting at least one diode anode to an intermediate point on the resistor, and capacitance coupling the anodes of both diodes.

3. In a receiver of frequency modulated carrier waves having an output circuit to provide modulated carrier waves of constant amplitude and variable frequency, a pair of diodes, a purely capacitative element connected between the anodes of said diodes, means coupling said output circuit to the anode of one of said diodes, a resonant circuit coupling the anode and cathode of one of said diodes, said element and resonant circuit being in series relation, a resistive load connected between the cathodes of said diodes, a carrier bypass condenser shunted across said load, a non-reactive connection between one of the anodes and the mid-point of said load, and means for deriving from across said load the modulation voltage of rectified carrier waves.

4. In a receiver of frequency modulated carrier waves having an output circuit to provide modulated carrier waves of constant amplitude and variable frequency, a pair of diodes, a resonant circuit, tuned to a frequency off-resonance with the center frequency of said waves, connected between one diode anode and ground, capacitance means coupling said output circuit to the anode of one of said diodes, a second capacitance means coupling the anodes of both diodes, a resistive load connected between the cathodes of said diodes, a carrier bypass condenser shunted across said load, a non-reactive connection between one of the anodes and the mid-point of said load, and means for deriving from across said load the modulation voltage of rectified carrier waves.

5. A rectifier circuit for modulated high frequency waves including, in combination, a source of waves of a desired freqency, a pair of diodes, a tuned circuit off-resonance with said desired frequency, an impedance path connected between the anode of one diode and ground, said path consisting of an untuned capacitative element in series with said tuned circuit, a resistive load element connected between the diode cathodes, means connecting the anode of the second diode to substantially the midpoint of said load element, said second diode anode being connected to the junction of said element and tuned circuit, and means connected between said load element and anodes for compensating for excessive mistuning of said tuned circuit.

6. A rectifier circuit for modulated high frequency waves including, in combination, a source of waves of a desired frequency, a pair of diodes, a tuned circuit off-resonance with said desired frequency, an impedance path connected between the anode of one diode and ground, said path consisting of an untuned capacitative element in series with said tuned circuit, a resistive load element connected between the diode cathodes, means connecting the anode of the second diode to substantially the midpoint of said load element, said second diode anode being connected to the junction of said element and tuned circuit, said capacitative element being the stray capacity existing between the anodes of said diodes, and means connected between said load element and anodes for compensating for excessive mistuning of said tuned circuit.

7. A rectifier circuit for modulated high frequency waves including, in combination, a source of waves of a desired frequency, a pair of diodes, a tuned circuit off-resonance with said desired frequency, an impedance path connected between the anode of one diode and ground, said path consisting of an untuned capacitative element in series with said tuned circuit, a resistive load element connected between the diode cathodes, means connecting the anode of the second diode to substantially the midpoint of said load element, said second diode anode being connected to the junction of said element and tuned circuit, and means connected between said load element and anodes for compensating for excessive mistuning of said tuned circuit, said last means consisting of independent resistors connected between said load midpoint and each anode.

8. In combination, a source of modulated carrier waves, a pair of tuned circuits arranged in cascade, a pair of diode rectifiers, a load element connecting the cathodes of the diodes, said source being coupled to the first of the tuned circuits, a purely capacity element arranged in series with the second of the tuned circuits between one diode anode and ground, means connecting the second diode anode to the junction of said capacity element and second tuned circuit, means establishing one end of the load element at ground potential, means connecting substantially the midpoint of the load element to the said second diode anode, and at least the second tuned circuit being off-resonance with a desired carrier wave frequency.

9. In combination, a source of modulated carrier waves, a pair of tuned circuits arranged in cascade, a pair of diode rectifiers, a load element connecting the cathodes of the diodes, said source being coupled to the first of the tuned circuits, a purely capacity element arranged in series with the second of the tuned circuits between one diode anode and ground, means connecting the second diode anode to the junction of said capacity element and second tuned circuit, said capacity element being connected between the anodes of both diodes, means establishing one end of the load element at ground potential, means connecting substantially the midpoint of the load element to the said second diode anode, and at least the second tuned circuit being off-resonance with a desired carrier wave frequency.

ERIC ALFRED GREEN.